United States Patent
Kawamura et al.

(10) Patent No.: US 8,876,493 B2
(45) Date of Patent: Nov. 4, 2014

(54) FAN MOTOR AND BLOWER INCLUDING THE SAME MOTOR

(75) Inventors: Kiyomi Kawamura, Osaka (JP); Hu Li, Osaka (JP); Yuichi Yoshikawa, Osaka (JP); Hiroshi Murakami, Osaka (JP); Yasushi Kato, Kyoto (JP)

(73) Assignee: Panasonic Corporation, Osaka (JP)

( * ) Notice: Subject to any disclaimer, the term of this patent is extended or adjusted under 35 U.S.C. 154(b) by 581 days.

(21) Appl. No.: 12/716,382

(22) Filed: Mar. 3, 2010

(65) Prior Publication Data

US 2010/0226802 A1 Sep. 9, 2010

(30) Foreign Application Priority Data

Mar. 6, 2009 (JP) ................ 2009-052837

(51) Int. Cl.
| F04B 17/03 | (2006.01) |
| H02K 16/02 | (2006.01) |
| F04D 13/06 | (2006.01) |
| H02K 7/14 | (2006.01) |

(52) U.S. Cl.
CPC ............ *H02K 16/02* (2013.01); *F04D 13/0673* (2013.01); *F04D 13/0666* (2013.01); *H02K 7/14* (2013.01)
USPC ..................... 417/350; 417/423.5; 417/423.7; 310/114; 310/266

(58) Field of Classification Search
CPC ..................... F04D 13/0666; F04D 13/0673
USPC ............. 417/350, 423.5, 423.7, 410.1, 423.1; 310/114, 266
See application file for complete search history.

(56) References Cited

U.S. PATENT DOCUMENTS

| 2,337,325 | A | * | 12/1943 | Hach et al. ................... 454/205 |
| 3,102,483 | A | * | 9/1963 | Najimian, Jr. et al. ........ 417/350 |
| 3,102,679 | A | * | 9/1963 | Rudy ............................... 417/84 |
| 3,272,129 | A | * | 9/1966 | Leopold ........................ 417/350 |
| 3,279,681 | A | * | 10/1966 | Bandlow ......................... 415/99 |
| 3,469,772 | A | * | 9/1969 | McDonald .................... 417/350 |
| 6,193,473 | B1 | * | 2/2001 | Mruk et al. .................... 417/350 |
| 6,232,696 | B1 | | 5/2001 | Kim et al. |
| 6,450,780 | B1 | * | 9/2002 | Larjola ........................... 417/350 |
| 6,497,201 | B1 | * | 12/2002 | Werson ...................... 123/41.12 |
| 6,616,421 | B2 | * | 9/2003 | Mruk et al. .................... 417/350 |
| 6,896,478 | B2 | * | 5/2005 | Botros et al. .................. 415/101 |
| 6,915,650 | B2 | | 7/2005 | Ito et al. |
| 7,626,299 | B2 | | 12/2009 | Yoshikawa et al. |
| 2004/0098995 | A1 | | 5/2004 | Ito et al. |

FOREIGN PATENT DOCUMENTS

| CN | 101322303 A | 12/2008 | |
| EP | 1879283 A1 * | 1/2008 | ............ H02K 16/02 |
| JP | 54-041401 A | 4/1979 | |
| JP | 60-008105 A | 1/1985 | |

(Continued)

OTHER PUBLICATIONS

Chinese Office Action for 201010129369.4 issued May 9, 2012.

*Primary Examiner* — Charles Freay
*Assistant Examiner* — Christopher Bobish
(74) *Attorney, Agent, or Firm* — RatnerPrestia

(57) ABSTRACT

A fan motor includes a pair of fans axially mounted to both sides of a rotary shaft of the motor. The motor includes an inner rotor placed inside a stator wound with windings and an outer rotor placed outside the stator. The motor thus has a dual-rotor structure where the inner rotor and the outer rotor are held such that both the rotors can rotate on the rotary shaft.

1 Claim, 4 Drawing Sheets

(56) References Cited

FOREIGN PATENT DOCUMENTS

| | | | |
|---|---|---|---|
| JP | 05-328690 A | 12/1993 |
| JP | 07-144528 | 6/1995 |
| JP | 07-144528 A | 6/1995 |
| JP | 10-084655 A | 3/1998 |
| JP | 2001-037133 A | 2/2001 |
| JP | 2001-046285 A | 2/2001 |
| JP | 2002-218702 A | 8/2002 |
| JP | 2003-507995 A | 2/2003 |
| JP | 2004-161060 A | 6/2004 |
| JP | 2006-240599 A | 9/2006 |
| JP | 2008-141852 A | 6/2008 |

* cited by examiner

FAN MOTOR AND BLOWER INCLUDING THE SAME MOTOR

FIELD OF THE INVENTION

The present invention relates to a fan motor to be used in vehicles or air-conditioners, and a blower including the same fan motor. More particularly it relates to a fan motor including fans on both sides thereof, and a blower including the same fan motor.

BACKGROUND OF THE INVENTION

A fan motor used in a vehicle for air-conditioning needs to be compact and produce a large volume of airflow. To achieve these targets, a fan motor and a blower are disclosed in Unexamined Japanese Patent Application Publication No. H07-144528 (Patent Literature 1). The fan motor and the blower disclosed can operate more efficiently, and produce lower noises, and be downsized. Such a conventional fan motor as disclosed in Patent Literature 1 includes a double-sided shaft, i.e. the shaft extends through the motor to both sides and a fan is respectively put on both sides of the shaft to form a double-fan structure. For instance, as shown in patent literature 1, a centrifugal fan shaped cylindrically is put on both sides of the shaft for the blower to suck air, and the air is discharged along one direction. This structure allows the blower to suck a greater volume of air and achieve a higher sucking efficiency than a single-side fan structure where the fan is mounted on a single side of the shaft. On top of that, since the fan is mounted on both sides of the shaft respectively, the fans can operate in well-balanced manner than the fan mounted on a single side of the shaft, and lower noises can be thus achievable.

Unexamined Japanese Patent Publication No. 2001-37133 (Patent Literature 2) discloses a technique on a brushless motor which includes a stator with toroidal windings, an inside rotor and an outside rotor. This structure employed in a conventional brushless motor allows reducing a volume of the coil end, lowering the copper loss while outputting greater torque.

The double-fan structure discussed above basically places a motor between the two fans, so that when the width of the motor is great along the rotary shaft of the motor, the fans are obliged to reduce their widths. A narrower width of the fan will reduce the cubic volume of the fan, and thus the airflow quantity decreases. To obtain a sufficient airflow quantity, the width of the motor along the rotary shaft should be reduced.

SUMMARY OF THE INVENTION

A fan motor of the present invention includes a pair of fans, each of which is mounted on each side of the rotary shaft of the motor. The motor includes an inside rotor and an outside rotor placed respectively inside and outside a stator wound with windings, and the two rotors are held by the rotary shaft such that they can rotate on the shaft. In other words, this motor has a dual-rotor structure.

The structure discussed above allows the stator to provide both the inside rotor and the outside rotor with rotary torque, so that higher torque is obtainable than a single-rotor structure. The structure also allows the double-fan motor to be downsized and to be thinner, and allows increasing the ratio of fan width vs. width of the fan motor along the rotary shaft.

A blower of the present invention includes the foregoing fan motor of the present invention. The blower has intake ports for supplying air to openings of the fans, and discharges the air sucked through the intake ports from the interior to the exterior of each one of the fans. This structure allows forming the blower that can perform the features of the fan motor of the present invention.

DETAILED DESCRIPTION OF PREFERRED EMBODIMENT

An exemplary embodiment of the present invention is demonstrated hereinafter with reference to the accompanying drawings.

Exemplary Embodiment

Figure 1:
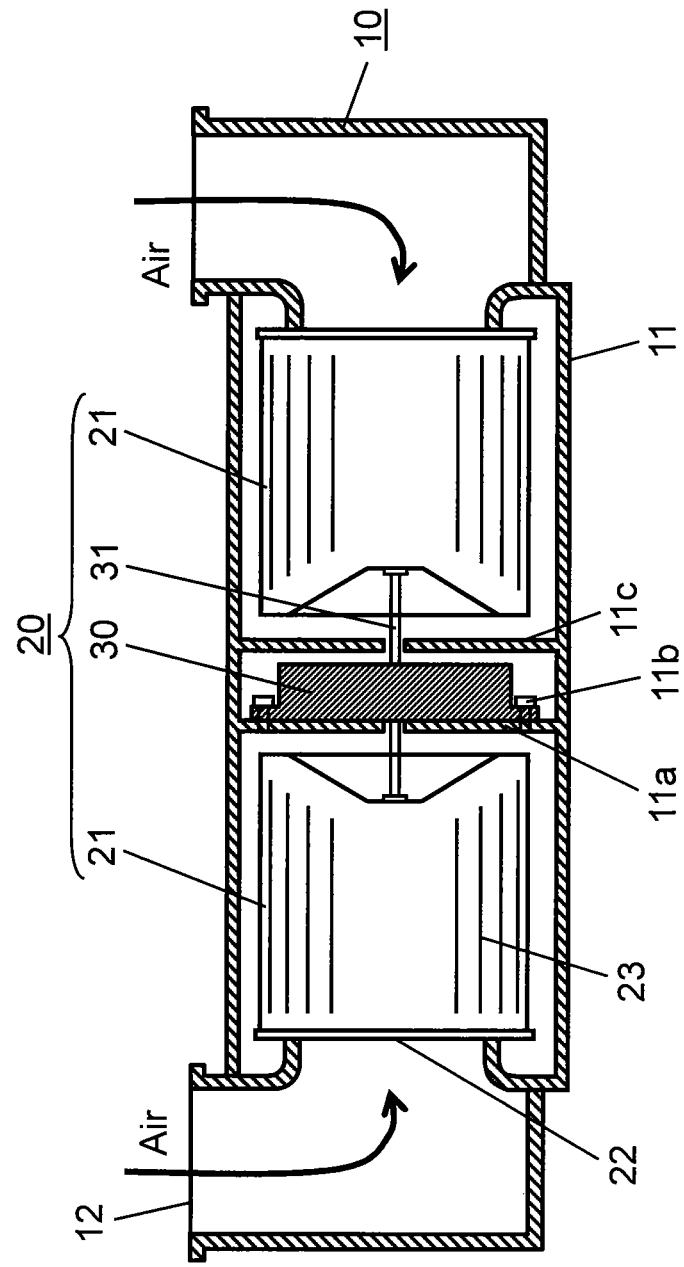
FIG. 1 shows an interior structure of a blower in accordance with an embodiment of the present invention.

FIG. 1 shows an interior structure of blower 10 in accordance with the embodiment of the present invention. Blower 10 includes fan motor 20 equipped with a pair of fans 21 each of which is mounted to both sides, along the axial direction, of rotary shaft 31 of motor 30. In other words, motor 30 includes a double-sided rotary shaft protruding from the motor body to both sides. Fan motor 20 in accordance with the embodiment thus forms a double-fan structure, i.e. each fan 21 is mounted to both sides of the rotary shaft of motor 30.

Each one of the pair of fans 21 is shaped identically to each other, and in this embodiment, each fan 21 operates as a centrifugal fan with a cylindrical shape of which inside is hollow. Since each fan 21 operates as the centrifugal fan, it has opening 22 at least on a first end of the cylindrical section for sucking air. Fan 21 also includes multi-wing section 23 formed of numerous holes and wings alternately placed on the cylindrical shape, and multi-wing section 23 discharges the sucked air.

Fans 21 discussed above are rigidly mounted to rotary shaft 31 of motor 30. In FIG. 1, each fan 21 is rigidly mounted to rotary shaft 31 at its second end opposite to opening 22. In other words, as shown in FIG. 1, fan motor 20 includes fans 21 placed both sides of motor 30, which is situated at the center between fans 21 along the rotary shaft, and openings 22 are located at both ends in the rotary shaft direction.

Fan motor 20 discussed above is placed inside housing 11 of blower 10, which includes support plate 11a around the center of the rotary shaft. Motor 30 is rigidly mounted to support plate 11a with screws 11b. Blower 10 also includes partition plate 11c around the center of the rotary shaft, so that motor 30 is sandwiched between support plate 11a and partition plate 11c. Blower 10 includes intake ports 12 for sucking air at its both sides along the rotary shaft.

The structure of blower 10 discussed above allows fans 21 to spin following the rotation of motor 30, and the spin of fans 21 allows sucking air through intake ports 12 on both sides. The sucked air flows inside fans 21 via openings 22, and the air is discharged, along the direction crossing the rotary shaft at right angles, by the rotation of multi-wing section 23. In other words, blower 10 sucks air through intake ports 12, and then discharges the air from the inside of fans 21 to the outside thereof.

Figure 2:
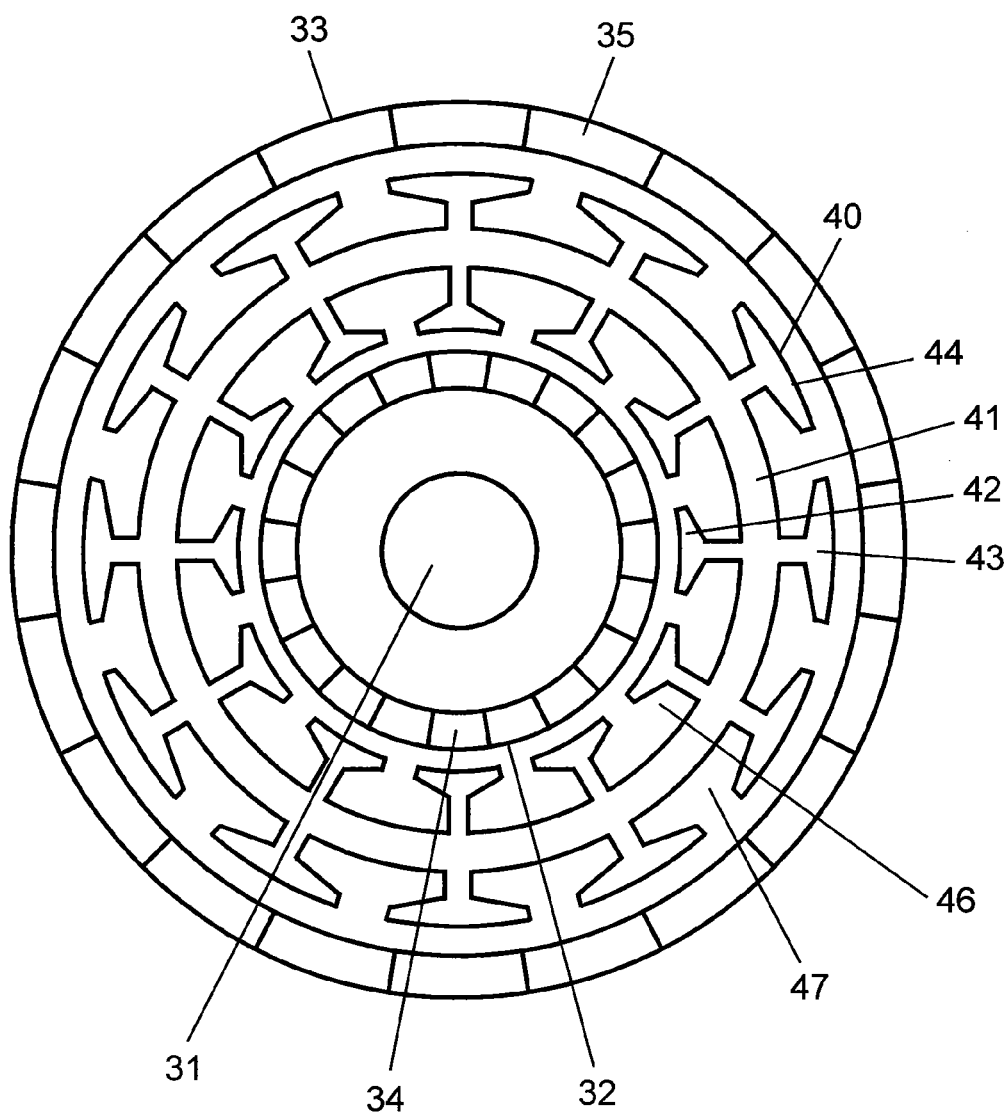
FIG. 2 shows a sectional view of a motor of the blower shown in FIG. 1.

Motor 30 to be employed in fan motor 20 is detailed hereinafter. FIG. 2 shows a cross section of motor 30 of blower 10 in accordance with the embodiment of the present invention. The cross section is viewed along the longitudinal direction of the rotary shaft. Windings to be wound on the stator are omitted for simply depicting the structure. Motor 30 used in this embodiment is a brushless motor driven by three-phase AC in which phases are shifted by 120° from each other.

Motor 30 in accordance with the embodiment, as shown in FIG. 2, includes stator 40, inner rotor 32 placed inside stator 40, outer rotor 33 placed outside stator 40. Motor 30 thus forms a dual-rotor structure.

Stator 40 is formed by winding the windings (not shown) on stator core 44, which includes annular yoke 41, multiple inner teeth 42 protruding inward from yoke 41, and multiple outer teeth 43 protruding outward from yoke 41. Stator core 44 used in this embodiment has an identical number of inner teeth 42 and outer teeth 43, and the circumferential centers of each one of inner teeth 42 and outer teeth 43 are aligned on one straight line respectively extending outward from the rotary center. Each one of inner teeth 42 and outer teeth 43 is symmetrically formed with respect to the circumferential center. An opening, i.e. slot 46, is formed between respective adjacent inner teeth 42, and an opening, i.e. slot 47, is formed between respective adjacent outer teeth 43. Windings corresponding to three phases are wound in a toroidal winding manner on yoke 41 by using these openings of stator core 44. To be more specific, the windings are wound the windings on yoke 41 at the places between inner slots 46 and outer slots 47.

Inner rotor 32 includes multiple permanent magnets 34 placed on its outer wall such that poles S and poles N of magnets 34 are alternately located. Inner rotor 32 confronts inner teeth 42 with a given space therebetween. Outer rotor 33 holds multiple permanent magnets 35 on its inner wall such that the poles S and poles N of magnets 35 are alternately located. Outer rotor 33 confronts outer teeth 43 with a given space therebetween. Inner rotor 32 and outer rotor 33 are connected to rotary shaft 31, and supported rotatably on rotary shaft 31 such that they can rotate circularly on shaft 31 confronting stator 40. They can be connected to rotary shaft 31 with adhesive or bolts, or they can be molded to shaft 31 with resin.

With the foregoing structure, an application of three-phase AC to the windings of stator 40 allows the magnetism to generate attraction force and repulsion force between inner teeth 42 and inner rotor 32 as well as between outer teeth 43 and outer rotor 33. Inner rotor 32 and outer rotor 33 thus rotates on rotary shaft 31. Particularly in the case of the dual rotor structure, where the rotors are placed both inside and outside the stator 40 respectively, driving torque of inner rotor 32 and that of outer rotor 33 are added together, so that greater torque than the single rotor structure is obtainable with the compact structure.

Figure 3:
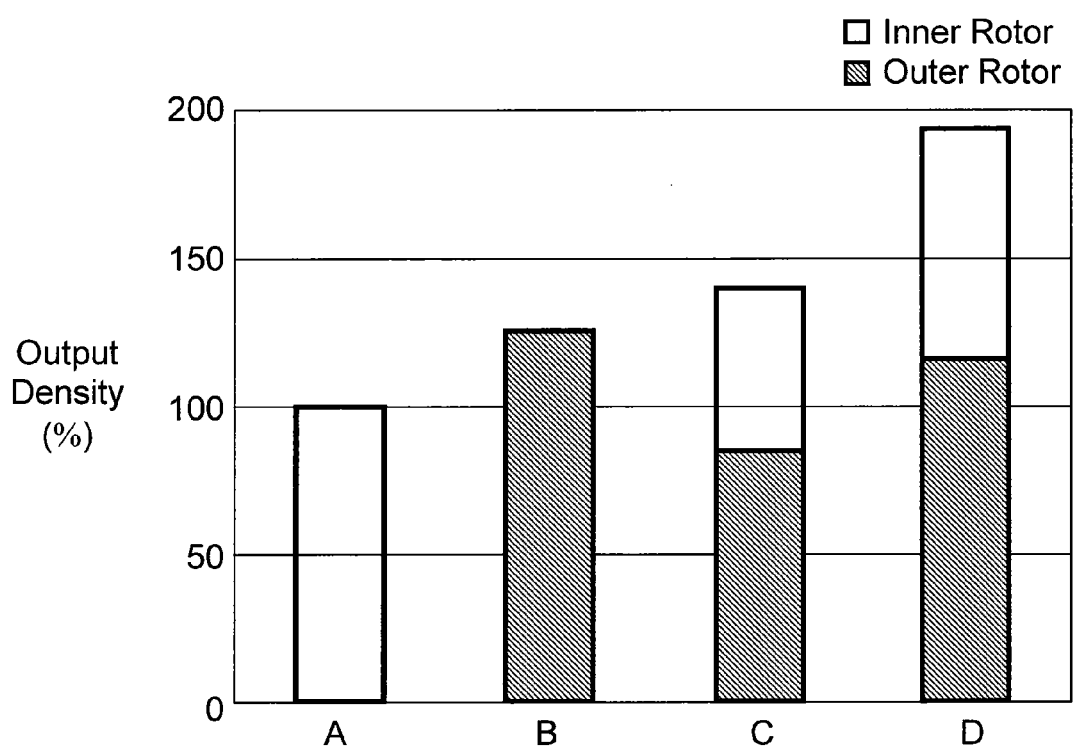
FIG. 3 shows a comparison in output density between a dual-rotor structure and a single-rotor structure.

FIG. 3 shows a comparison of output density between the dual-rotor motor and the single-rotor motor. The output density is an output per cubic volume of the motor. In FIG. 3, "A" represents an inner-rotor motor, "B" represents an outer-rotor motor, "C" represents a dual-rotor motor with concentrated windings, and "D" represents a dual motor with toroidal windings. The blank sections on the bar graphs indicate the output densities by the inner rotors, and hatched sections on the bar graphs indicate the output densities by the outer rotors. In the case of bar graphs "C" and "D", the output densities by the inner and the outer rotors are added together.

As shown in FIG. 3, the dual-rotor motor with the toroidal windings produces an output density 1.9 times as much as the inner rotor motor, and 1.5 times as much as the outer rotor motor. Use of the dual-rotor motor with the toroidal windings, i.e. use of motor 30, thus allows increasing the blowing force of the blower 1.5 to 1.9 times as much as that of the motor using a single-rotor structure although the cubic volumes of the motors are the same. This means that the driving motor can be downsized by 35-50% in cubic volume when the same outputs are maintained.

A comparison between the dual-rotor motor with the toroidal windings and the dual-rotor motor with the concentrated windings finds that the toroidal windings type obtains an output density 1.4 times as much as the concentrated windings type. As a result, the toroidal windings type can produce blowing force 1.4 times as much as the concentrated windings type when these two driving motors have the same cubic volumes.

The difference in the output density between the concentrated windings and the toroidal windings of the dual-rotor motor can be caused by this reason: The magnetic flux of the concentrated windings runs from the outer rotor to the teeth of the stator, and enters the inner rotor, then runs through the teeth of the stator, and then returns to the outer rotor. The magnetic flux thus forms a magnetic-flux loop. Since the magnetic flux runs through the outer magnets and the inner magnets, it seems there are many air gaps, so that the magnetic fluxes of the magnets cannot be effectively used. On the other hand, the magnetic flux of the toroidal windings, employed in the structure shown in FIG. 2, runs from outer rotor 33 to outer teeth 43 of stator 40, and runs through yoke 41, and then returns to outer rotor 33, namely, the magnetic flux forms a first loop. Another magnetic flux of the toroidal windings runs from inner rotor 32 to inner teeth 42 of stator 40, and runs through yoke 41, and then returns to inner rotor 32, namely, this magnetic flux forms a second loop. As a result, it seems there are air gaps similar to those generated in the single-rotor motor. The dual-rotor motor with the toroidal windings thus obtains an output equal to the total output produced by two single-rotor motors.

Motor 30 thus employs the dual-rotor structure where the windings are wound on yoke 41 in the toroidal winding manner, so that the coil end and the length of the windings can be shortened comparing with those of the single-rotor motor with a distribution winding. On top of that, a smaller resistance of the windings allows reducing the copper loss, so that the motor can achieve a higher efficiency. The shorter coil end and the shorter length of the windings allow lowering the height of the wound coil and the height of the stator, so that the motor can be thinned along the rotary shaft. The fan motor thus decreases the width ratio of the motor along the rotary shaft, so that the width ratio of the fans can be increased. As a result, the blower employing the dual-rotor motor with the toroidal windings can produce a greater airflow quantity than other types of blowers having the same cubic volumes.

For instance, a comparison between a single-rotor motor, which includes only an inner rotor, and motor 30 discussed above finds that motor 30 can obtain the output density 1.9 times as much as the single-rotor motor. When the two motors discussed above and having the same outputs are compared, motor 30 can be downsized by approx 45% in thickness. The smaller thickness allows the fans on both sides to be longer by approx. 20%, so that the blower employing motor 30 can increase the airflow quantity by 40% when the foregoing two motors operate at the same rpm. In a case where these two blowers produce the same airflow quantity, the blower employing motor 30 can be downsized by approx. 40%.

Motor 30 employing the dual-rotor structure with the toroidal windings can reduce the copper loss, which is generated by running an electric current through the windings and increases proportionately to the current squared. A greater portion of heat generated in the motor is produced from the windings, so that the foregoing structure in accordance with the embodiment can suppress the temperature rise of the motor. There is thus no need to enlarge a physical size of a motor even if the motor is not exposed to the airflow, so that the blower can be downsized or can obtain a greater airflow quantity.

The suppression of temperature rise of motor 30 as discussed above allows eliminating the process of cooling motor 30 by using parts of the airflow of the blower. This is why the structure shown in FIG. 2 is employed, i.e. motor 30 is sandwiched between support plate 11a and partition plate 11c. This structure allows preventing the air temperature in an airflow path from rising due to the heat generated in motor 30. In a case where motor 30 generates so smaller heat that the heat does not adversely affect the airflow, partition plate 11c can be removed. This structure further increases the ratio of the fan width.

The width of each one the fans is increased while the airflow quantity is kept the same, so that the rpm can be reduced. Windy noise generated by a fan increases proportionately to a circumferential speed of the outer most edge of the fan, so that the reduction of rpm by 40% can lower the windy noise by approx. 80%. The greater width of the fan allows reducing the rpm, and thus the noise can be lowered.

The foregoing instance refers to the case where two fans 21 are rigidly mounted to both sides of rotary shaft 31 of motor 30; however, fan 21 can be fixed to the rotor. This embodiment, in particular, motor 30 includes inner rotor 32 and outer rotor 33, so that first fan 21 can be fixed to inner rotor 32 and second fan 21 can be fixed to outer rotor 33. In other words, first fan 21 can be mounted to either one of rotary shaft 31 or outer rotor 33, and second fan 21 can be mounted to either one of rotary shaft 31 or inner rotor 32.

Figure 4:
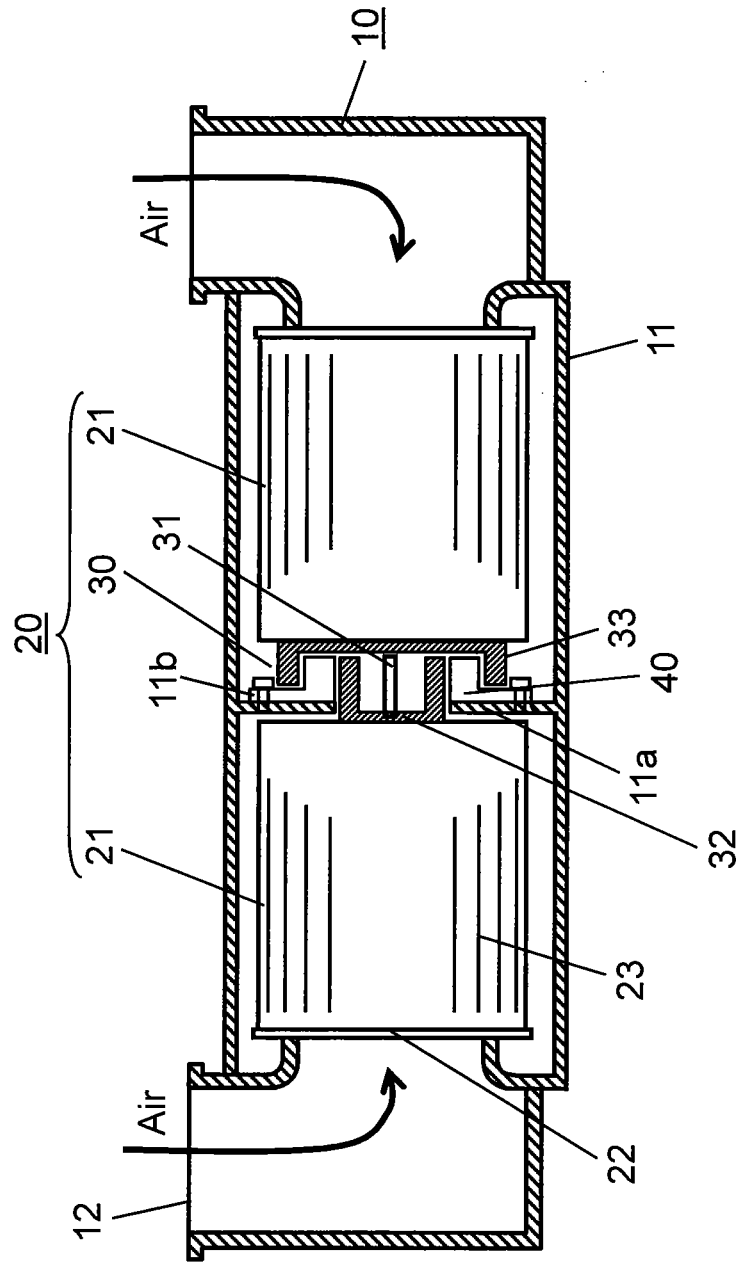
FIG. 4 shows another structure of the blower in accordance with the embodiment of the present invention.

FIG. 4 shows another structure of blower 10 in accordance with the embodiment of the present invention. Blower 10 shown in FIG. 4 includes first fan 21 directly connected to inner rotor 32 and second fan 21 directly connected to outer rotor 33. The direct connection between the rotors and the fans or unitary molding the rotors with the fans into one body allows fans 21 to be mounted directly to motor 30 without connecting fans 21 to the rotary shaft. This structure allows increasing the mounting strength and supporting strength of fan 21 as well as reducing the mounting space thereof, so that the blower can be downsized. In the case of mounting the fan to the rotary shaft with screws and bolts, the rotary shaft is obliged to be longer, so that torsional resonance of the shaft occurs, which causes vibration and noise. The direct connection of the fan to the rotor or the unitary molding thereof can eliminate the connection of the fan to the shaft, so that the conventional problem of torsional resonance of the shaft can be reduced.

As discussed above, the fan motor of the present invention includes a pair of fans axially mounted to both sides of the rotary shaft of the motor. The motor also includes an inner rotor and an outer rotor each of which is respectively placed inside and outside the stator which is wound with windings. The motor thus employs a dual-rotor structure where the inner rotor and the outer rotor are held such that both the rotors can rotate on the rotary shaft. The structure discussed above allows the stator to generate rotating torque to both of the inner and outer rotors, so that greater torque than a single-rotor structure is obtainable. The foregoing motor operating as a motor having a double-sided rotary shaft can be thus downsized and thinned, so that the ratio of a fan width along the rotary shaft in the fan motor can be increased.

The blower of the present invention includes the fan motor discussed above.

The motor having the double-sided rotary shaft thus can be thinner, which allows the fan motor of the present invention to decrease the ratio of the motor width along the rotary shaft in the fan motor while the ratio of the fan width can be increased. The present invention thus can provide the fan motor capable of producing a sufficient airflow quantity, and the blower employing this fan motor.

The present invention can provide a fan motor which increases the airflow quantity of the fan and operates at higher efficiency with lower noise, and also provide a blower equipped with the same fan motor. The present invention is thus useful for the fan motors to be used in vehicles and air-conditioners, and is also useful for the blower equipped with the same fan motor.

What is claimed is:

1. A blower equipped with a fan motor that comprises:
the fan motor mounting a first fan and a second fan axially to both sides of a rotary shaft of a motor;
a housing containing the fan motor inside;
intake ports for sucking air and supplying the air to the first fan and the second fan; and
a support plate for mounting the motor,
wherein the motor comprises an inner rotor placed inside a stator wound with windings and an outer rotor placed outside the stator, and forms a dual-rotor structure in which the inner rotor and the outer rotor are held such that both the inner rotor and the outer rotor can rotate on the rotary shaft,
wherein the stator includes a stator core having an annular yoke, a plurality of inner teeth protruding inward from the yoke, and a plurality of outer teeth protruding outward from the yoke, and wherein the windings are wound on the yoke,
wherein the support plate is placed between the motor and the first fan around the center of the rotary shaft,
wherein each of the first fan and the second fan has an opening for sucking air and is shaped cylindrically for operating as a centrifugal fan,
wherein the first fan directly connected to the inner rotor and the second fan directly connected to the outer rotor without separate shafts between the first fan and the inner rotor and the second fan and the outer rotor,
wherein the blower discharges the air sucked through the intake ports to outside of the first fan and the second fan.

* * * * *